July 7, 1936.    H. E. McCRERY    2,046,693
WEIGHING BATCHER
Filed March 29, 1934    6 Sheets-Sheet 2

INVENTOR
Harold E. McCrery
by his attorneys
Byrnes, Stebbins & Blenko

July 7, 1936.  H. E. McCRERY  2,046,693
WEIGHING BATCHER
Filed March 29, 1934  6 Sheets-Sheet 5

INVENTOR
Harold E. McCrery
by his attorneys
Byrnes, Stebbins & Blenko

July 7, 1936. H. E. McCRERY 2,046,693
WEIGHING BATCHER
Filed March 29, 1934 6 Sheets-Sheet 6

Fig.9.

INVENTOR
Harold E. McCrery
by his attorneys
Byrnes, Stebbins & Blenko

Patented July 7, 1936

2,046,693

UNITED STATES PATENT OFFICE 2,046,693

WEIGHING BATCHER

Harold E. McCrery, Aspinwall, Pa., assignor to Blaw-Knox Company, Blawnox, Pa., a corporation of New Jersey Application March 29, 1934, Serial No. 717,939

17 Claims. (Cl. 249—14)

My invention relates to apparatus for automatically weighing out predetermined amounts of different classes of material, such as crushed stone, gravel and sand for cement, from separate storage bins and discharging the measured amounts of material successively to a weigh hopper. It is also useful for dispensing given amounts of a single material.

While automatic batch-weighing apparatus has been proposed heretofore, all such apparatus with which I am familiar is characterized by inaccuracy and a slow speed of operation. The general object of my invention is to provide an automatic batch weigher which is accurate to a high degree, and fast and reliable in operation, so that the desired sequence of functions is properly performed in regular order.

In accordance with my invention, I provide storage bins adapted to discharge through gated hoppers into a weigh hopper or receiver. The weigh hopper has a bottom door for discharging the various materials after measured amounts thereof have been dumped into the weigh hopper from the gated feed hoppers. The weight of material in the weigh hopper, in connection with auxiliary apparatus to be described in detail, controls the automatic operation of the apparatus and insures the feeding of the proper amount of various classes of material to the weigh hopper. Various interlocks are provided to prevent an improper operation sequence, such as the simultaneous opening of the feed hopper gates and the weigh hopper door. The invention also contemplates means for feeding material to the weigh hopper at a rapid rate until the desired weight has been nearly reached, and then continuing to feed material at a lower rate until the precise weight desired has been discharged. This, of course, contributes to extreme accuracy in measurement.

For a complete understanding of the invention, reference is made to the accompanying drawings illustrating a present preferred embodiment. In the drawings.

Figure 1:
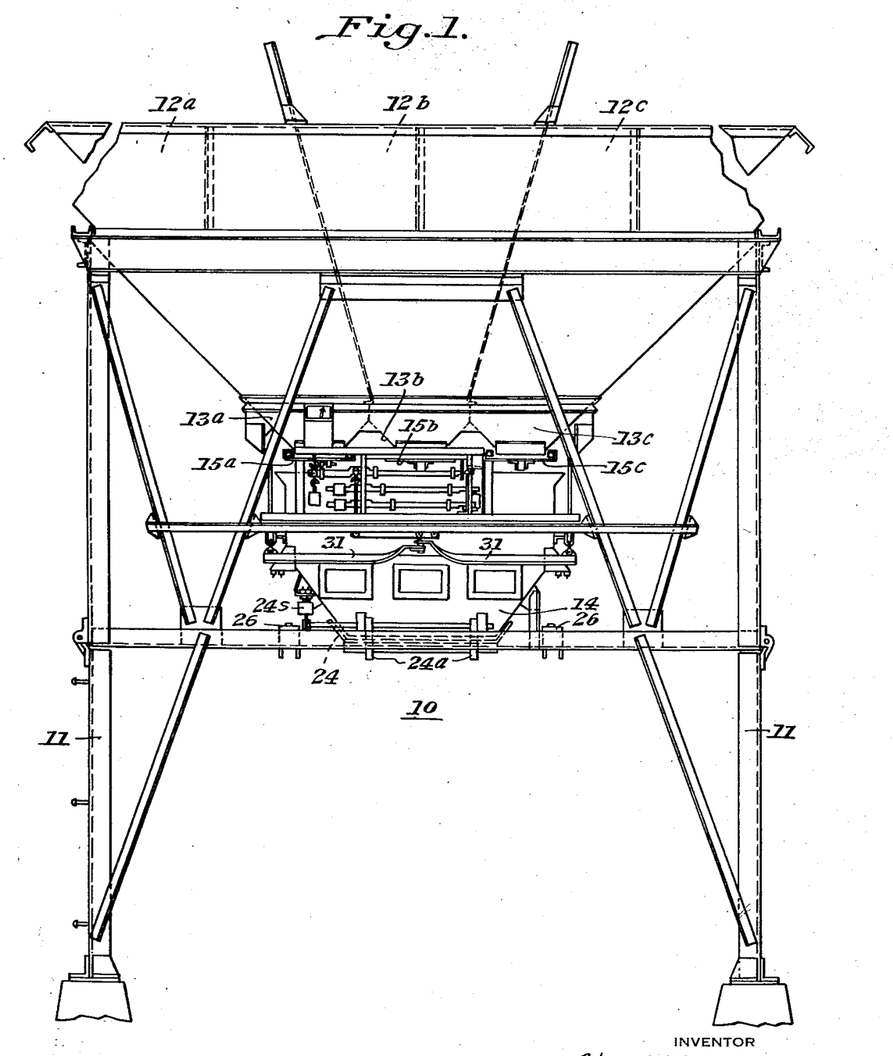
Figure 1 is a side elevation of a weighing batcher in accordance with my invention.
Figure 2:
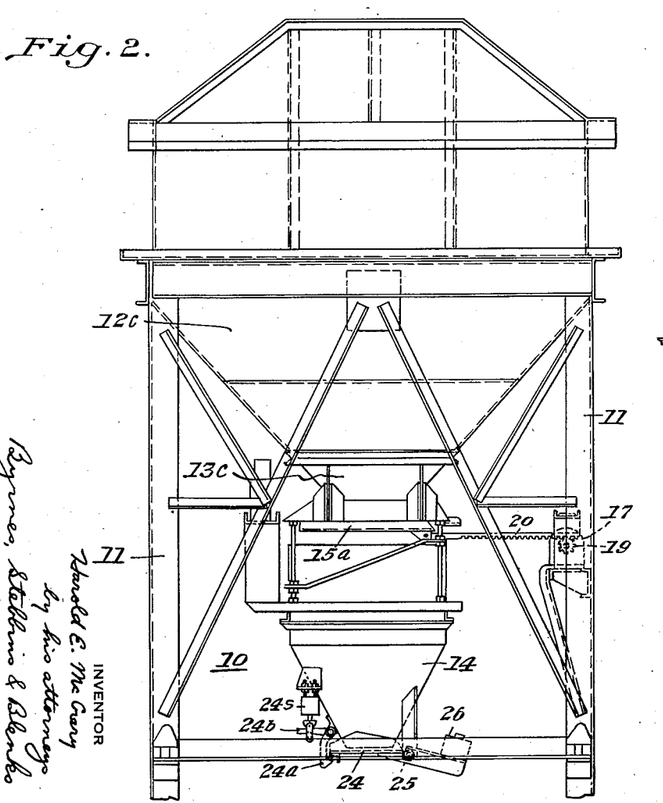
Figure 2 is an end elevation thereof.

Referring now in detail to the drawings, the batcher indicated generally at 10 comprises a frame 11 supporting storage bins 12a, 12b, and 12c at a sufficient distance above the ground to permit material to be dumped from the batcher into a vehicle standing therebelow. The bins 12a, 12b, and 12c have feed hoppers 13a, 13b, and 13c adapted to discharge into a weigh hopper 14. Gates 15a, 15b, and 15c control the flow of material from the bins into the weigh hopper. Guide chutes 14a having adjustable props 14b, direct material from the feed hoppers into the weigh hopper.

Figures 6, 7:
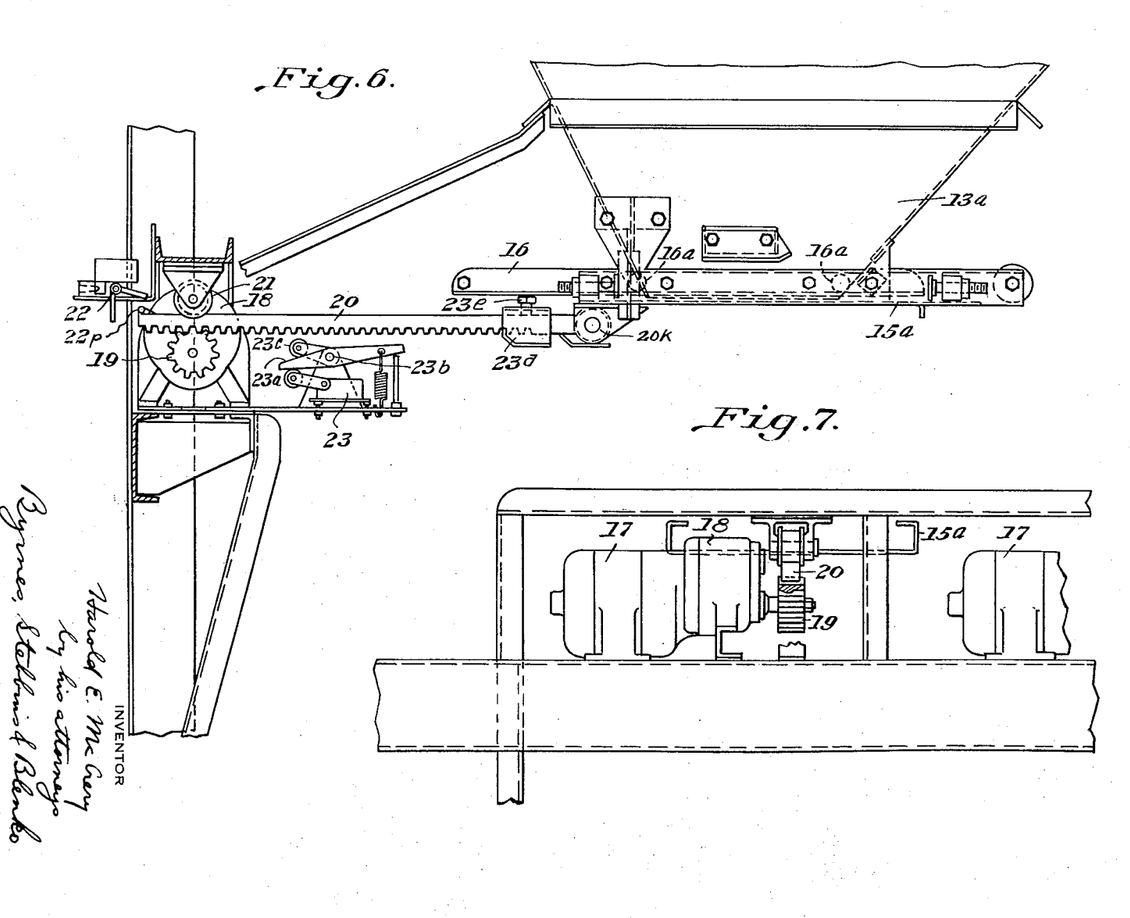
Figure 6 is a partial side elevation showing the feed hopper gate and its operating mechanism.
Figure 7 is a view partly in side elevation looking from the left in Figure 6, and partly in section.
Figure 8:
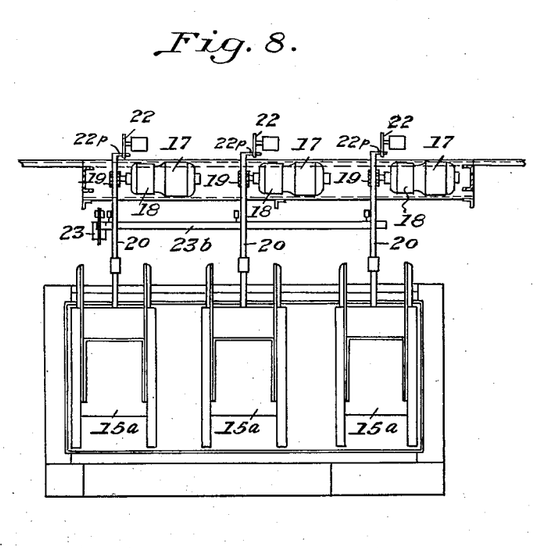
Figure 8 is a bottom plan view, largely diagrammatic, showing the several feed hopper gates.

The construction and operation of the feed hopper gates may be seen more clearly in Figure 6. They are similar to the gates of U. S. Patent No. 1,571,544. Since the operating mechanism of all the gates is the same, only one will be described. The gate 15a slides in guides 16 on rollers 16a back and forth under the mouth of the hopper 13a. A motor 17 through a reduction gearing 18 drives a pinion 19. A rack 20 connected to the gate 15a meshes with the pinion 19 and is held thereon by a roller 21. A resilient connection between the rack and gate is preferred, such as the pin and eye connection 20k, with a rubber cushioning sleeve on the pin. An interlock switch 22 is adapted to be operated between two alternative positions by the movement of the rack 20 which effects the initial opening and the final closing of the gate 15a. The switch 22 is engaged by a pin 22p which is preferably adjustably secured to the rack. A limit switch 23 is adapted to be operated by a lever 23a on a shaft 23b. Rollers 23c are carried on the shaft 23b in such positions as to be engaged by cams 23d carried by the rack bars 20 of the several gate-operating mechanisms. In this way, the full opening of any one of the gates will operate the switch 23. The cams 23d are adjustably secured to the racks 20 by set screws 23e.

Figure 4:
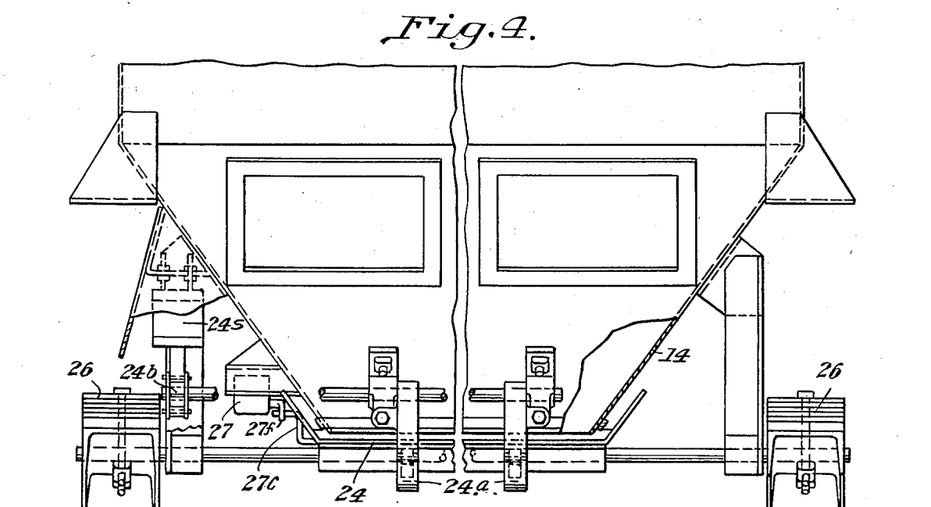
Figure 4 is a side elevation of the weigh hopper.
Figure 5:
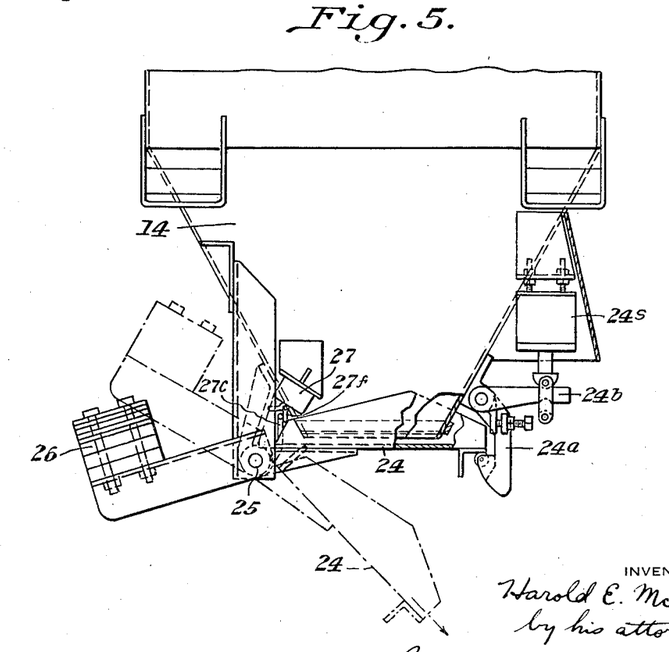
Figure 5 is an end elevation thereof partly in section.

Referring now to Figures 4 and 5, the weigh hopper 14 has a bottom door 24 hinged at 25 and counterweighted at 26. The door 24 is normally held closed by a latch 24a. A solenoid 24s operates a linkage 24b to release the latch. An interlock switch 27 having fingers 27f is operated from one position to the other by the engagement with said fingers of a crank 27c which moves with the door 24.

Figure 3:
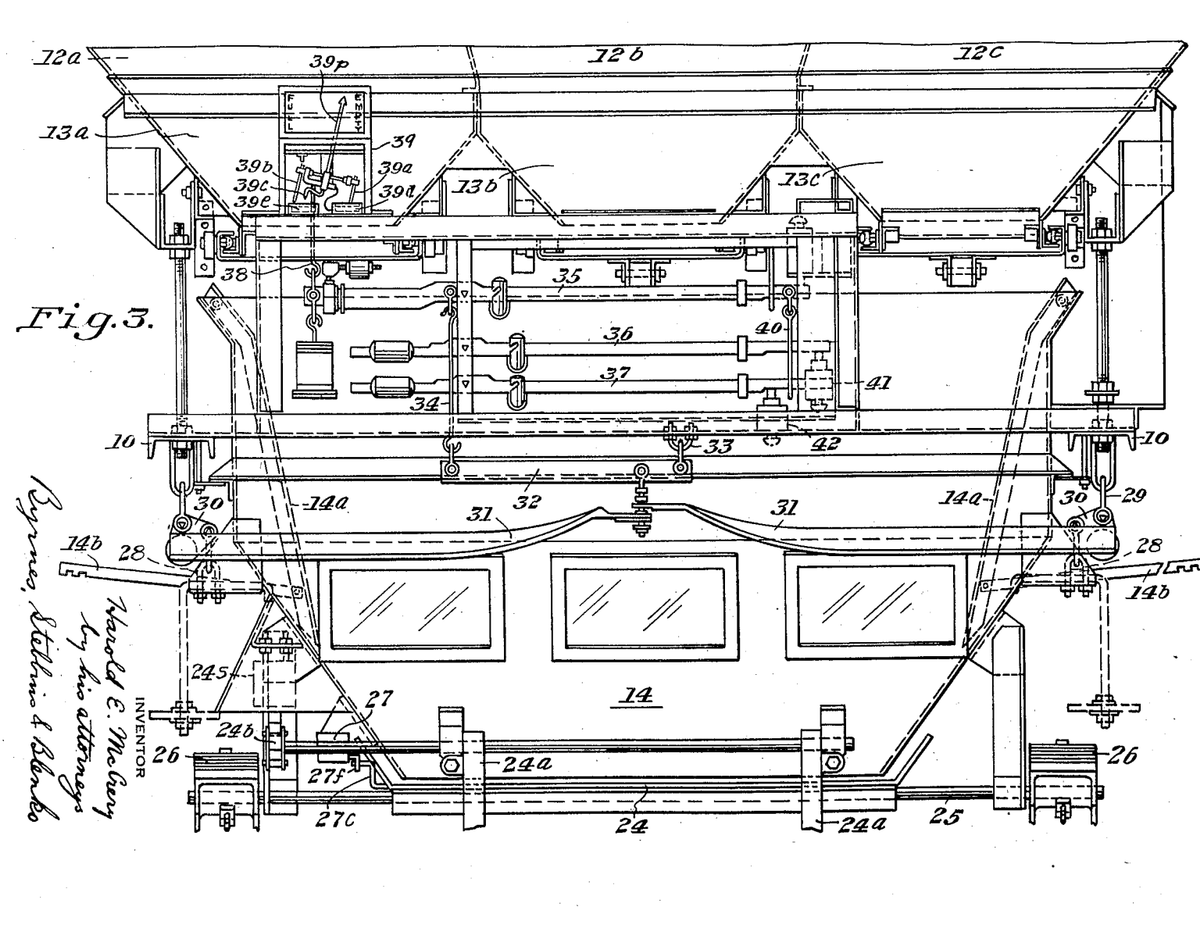
Figure 3 is a side elevation of a portion of Figure 1 to considerably enlarged scale.

The weigh hopper 14 is carried on U-bolts 28 suspended from a weighing linkage of levers and beams (see Fig. 3). This linkage is suspended from the frame 10 by hangers 29. The U-bolts 28 hang on knife edges from short levers 30 suspended on knife edges in the hangers 29. Long levers 31 fixed to the short levers 30 extend toward each other and bear on a lever 32. One end of the lever 32 is fixed to the frame 10 by a U-bolt 33. The other end is connected by a link 34 to a beam 35 of a multiple beam scale having additional beams 36 and 37. The left-hand end of the beam 35 is connected by a link 38 to an indicating and contact-making mechanism 39, which is essentially a swinging shaft having a pointed 39p and contacts 39a, 39b and 39c mounted in an insulating block pivoted for angular movement. The shaft on which the pointer and contacts are mounted is rotated through suitable means on reciprocation of the link 38. The contact 39a is adapted to dip into a mercury cup 39d while the contacts 39b and 39c are adapted successively to dip into a mercury cup 39e.

The scale beams 36 and 37 normally add their load to that of the beam 35 through a loop 40 suspended from the latter, engaging the two former. Electromagnets 41 and 42, having extensible plungers therein, are adapted to engage the ends of the beams 36 and 37 to remove the load thereof from the beam 35 at certain times, as will be explained in greater detail later. The counterpoises on the several beams are positioned so that the beams rise, respectively, when the desired weights of the several classes of material have been discharged into the weigh hopper.

Figure 9:
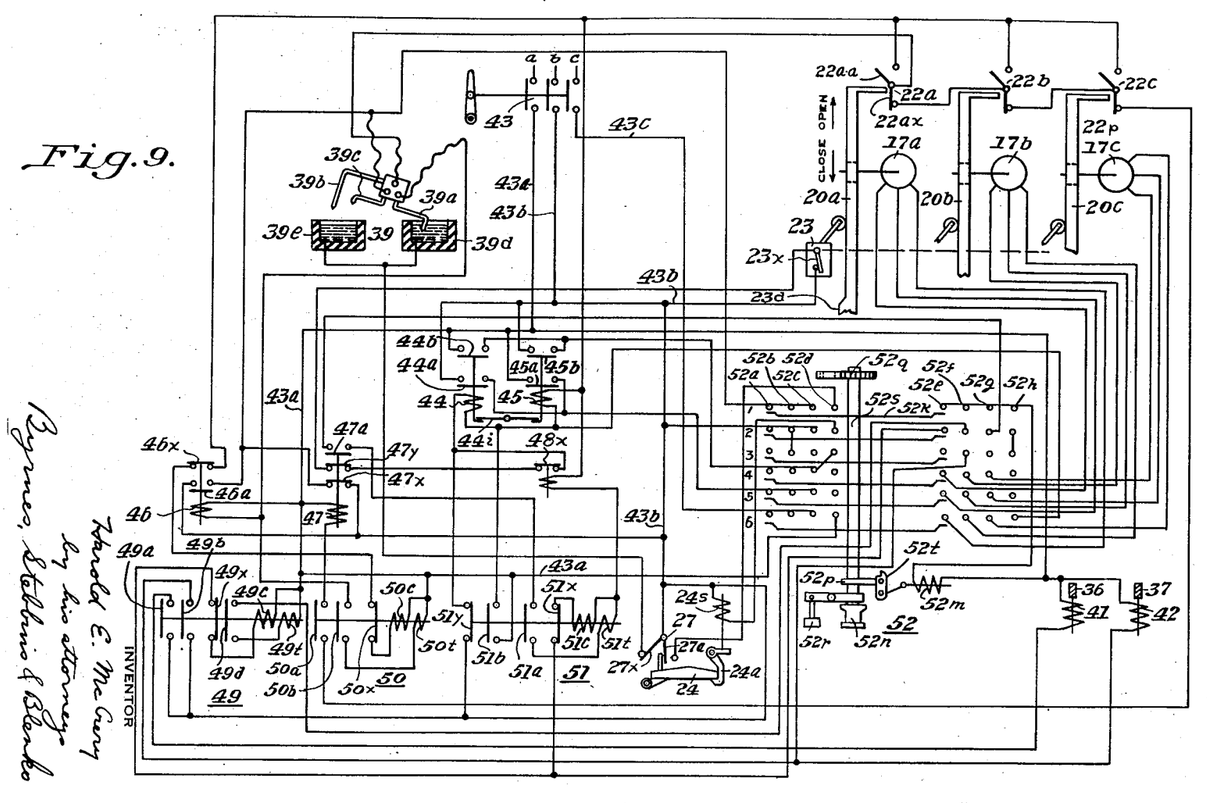
Figure 9 is a schematic illustration of an automatic control system for the apparatus of Figures 1 through 8.

Referring now to Figure 9, certain of the parts already described are illustrated there diagrammatically and are identified by the same reference numerals. In addition to the mechanism already described, however, electrical control apparatus is also employed. This includes a main circuit breaker 43, line contactors 44 and 45, control relays 46 through 51 and a selector 52. The limit switches, interlock switches, circuit breaker, contactors and relays are all well known and produced by a number of different manufacturers. The selector 52, however, is not as common as the other elements of the electrical system and deserves a brief description.

The selector 52 comprises a cylinder having a plurality of rows of contacts 52a, 52b, etc., arranged about the periphery thereof. The contacts in each row are numbered consecutively so that any contact may be identified by specifying its row and its number in the row, as 52a2, 52c3. A central shaft 52s is provided with a plurality of bridging contacts 52k, numbered consecutively 52k1, etc., which are adapted successively to connect corresponding contacts in spaced rows, on rotation and axial movement of the shaft 52s. As shown developed in Figure 9, contacts 52a and 52e are adapted to be bridged by their contacts 52k. On rotating the shaft 52s one notch, the contacts 52k are then in position to bridge contacts 52b and 52f, etc. The contacts 52k, however, do not engage their respective fixed contacts until the shaft 52s is moved axially. The shaft may be rotated freely while the contacts 52k are clear of their cooperating fixed contacts. By a simple mechanical lock, which it is not necessary to describe here, rotation of the shaft 52s is prevented after it has been moved axially to cause the contacts 52k to engage their cooperating fixed contacts. The shaft 52s may be turned and moved axially by a knob 52n. A reset button 52r is provided for restoring the shaft to its illustrated position. A lockout latch 52t is actuated by an electromagnet 52m to engage a detent 52p on the shaft 52s to hold it in such position that it cannot be moved axially or rotated. A ratchet and pawl 52q prevent reverse rotation of the shaft 52s.

The remaining details of the electrical control equipment will be described during the course of a description of the complete cycle of operations now to be given. In the following description of operation, the control circuits will be described simply by enumerating the relay or switch contacts which are closed to complete the circuit. The reference numeral applied to each relay or contactor will refer to the operating coil thereof unless otherwise specified, as in the case of relays having closing and tripping coils, which will be designated by the number of the relay with the suffixes c and t, respectively. The closing and tripping coils have self-operated deenergizing or cut-off contacts, in accordance with usual practice. These contacts, of course, remain closed long enough for the respective coils to accomplish their intended function. It will be understood that all contactors and relays, except those having tripping coils, are returned to their initial position on deenergization of the operating coils by gravity or spring force. Contacts of relays will be designated by the number applied to the operating coil with a suffix, the first few letters of the alphabet for front contacts and the last few letters for back contacts. Front contacts are those which are closed on movement of a device from its normal illustrated position. Back contacts are those which are closed in the normal position of the device.

In starting the operation of the system, the first step is the closing of the circuit breaker 43 to connect a suitable current source to phase conductors 43a, 43b, and 43c. The contact-operating mechanism 39 being in the illustrated position, the relay 46 is operated (43a, 46, 39a, 39d, 27x, 43b). Since this circuit includes the back contact 27x of the interlock switch 27 operated by the door 24, it will not be completed unless the door is closed, as shown. The system is now ready for the first weighing operation. This is effected by turning the shaft 52s by the knob 52n so that the contacts 52k on the shaft are in position to bridge the contacts in rows 52a and 52e. When the shaft 52s has been adjusted to this position, the knob 52n is pushed in so that the contacts 52k actually engage the contacts in the rows 52a and 52e. This causes the operation of the relay 49 (43a, 49c, 49x, 52e2, 52k2, 52a2, 43b.)

The operation of the relay 49 energizes beam-lifting magnets 41 and 42 (43a, 41, 49a, 43b; 43a, 42, 49b, 43b). The energization of the magnets 41 and 42, of course, removes the load of the beams 36 and 37 from the beam 35.

The lockout magnet 52m is also energized (43a, 52m, 52e1, 52k1, 52a1, 46a, 43b). The energization of the magnet 52m, of course, actuates the latch 52t and locks the shaft 52s in raised position, which, by the mechanical lock not shown, prevents further rotation of the shaft until the latch is released. The relay 51 is also operated by pushing the knob 52n (43a, 51c, 51x, 52e2, 52k2, 52a2, 43b).

The operation of the relay 51 causes the contactor 44 to operate immediately (43a, 51b, 44, 48x, 47y, 23x, 43b). The operation of the contactor 44 connects two phases of the supply circuit to the selector 52, which has already prepared a circuit for each phase to the motor 17a. The three terminals of the motor 17a extend to contacts 52e4, 52e5 and 52e6. By the bridging contacts 52k4, 52k5 and 52k6, they are connected to terminals 52a4, 52a5 and 52a6. Phase 43c is permanently connected to terminal 52a6. Phases 43a and 43b may be connected to the terminals 52a4 and 52a5 in either of two ways, by the operation of the contactors 44 and 45. The latter serve to make and break the motor circuit and to effect reversal of the motor by reversing two of its phases. The contactors 44 and 45, furthermore, are interlocked mechanically or electrically so that they cannot be operated at the same time since this would produce a short circuit. In Figure 9, I have shown a mechanical interlock 44i consisting simply of projections on each contactor and a pivoted lever which will pull either contactor open on operation of the other, if not already open. Connections are so made that operation of the contactor 44 causes the motor 17a to rotate in a direction such as to open the feed hopper gate 20a.

As soon as the gate 20a starts to open by rotation of the motor 17a, the front contact 22aa of its interlock switch 22a is closed, and the back contact 22ax thereof is open. This operation has no immediate effect, since the circuit controlled by the front contact 22aa extends to the contact 39b of the indicating and contact-making mechanism which, of course, is open until toward the completion of the first weighing operation. The opening of the gate 20a, therefore, continues until the cam 23d operates the limit switch 23 to open its back contact 23x. This, of course, opens the circuit of contactor coil 44 which thereupon opens to stop the motor 17a, leaving the gate 20a in the wide open position.

The hopper 13a thus discharges material, for example, crushed rock, into the weigh hopper 14, until the weight of the material discharged is sufficient to operate the contact mechanism 39 through the scale linkage. The first operation that occurs is the making of contact between the finger 39b and the pool 39e. Contactor 45 immediately closes (43a, 51b, 45, 22aa, 39b, 39e, 27x, 43b). Relay 48 is simultaneously operated to open its contact 48x, the coil 48 being in parallel with the contactor coil 45. The operation of the contactor 45 in the manner already described, causes the motor 17a to rotate in the reverse direction to close the gate 20a. The engagement of finger 39b with the pool 39e, of course, indicates that the weight discharged is approaching that for which the scale beam 35 is set. The gate 20a continues to close, closing the contact 23x and the limit switch 23, and finally opening the contact 22aa and closing contact 22ax as the gate is fully closed. As the contact 22aa is opened, the contact or coil 45 is deenergized and the motor 17a is stopped.

The relay 48 is simultaneously deenergized and closes its contact 48x. The original circuit for the contactor coil 44 is thus restored (43a, 51b, 44, 48x, 47y, 23x, 43b). The contactor 44 being operated, the motor 17a again rotates to open the gate 20a. Almost immediately, however, depending on the adjustment of the switch-operating pin 22p, the switch 22a is operated to close contact 22aa and open contact 22ax. The closing of the contact 22aa reenergizes the contactor coil 45 and the relay coil 48. The relay 48 opens a circuit of the contactor 44 at 48x and the contactor 45 operates to again reverse the motor 17a. Closing movement of the gate 20a again opens contact 22aa and closes contact 22ax with the same result as before, namely, that the motor 17a and the gate 20a are stopped and reversed by opening of the contactor 45 and closing of the contactor 44.

This back and forth movement of the gate 20a throughout a short distance permits the flow of material from the feed hopper to the weigh hopper to continue in reduced volume, that is, in a dribble feed. Finally, of course, the weight of material discharged into the weigh hopper is sufficient to operate the indicating and contact-making mechanism 39 still further so that the finger 39a is withdrawn from the pool 39d. This may occur, obviously, when the gate 20a is partly open or when it is fully closed, or in other words, when the contact 22aa is closed or when it is open. In any case, the breaking of contact between the finger 39a of the pool 39d deenergizes relay 46. The opening of contact 46a opens one of two parallel circuits through the lockout magnet 52m. The other circuit is closed through 47x.

If the finger 39a breaks contact with pool 39d when contact 22aa is closed, that is, when the gate is partly open, the contactor 45 is closed and the motor 17a is turning to close the gate, the only result will be the operation of relay 50 (43a, 50c, 50x, 46x, 22aa, 39b, 39e, 27x, 43b). The contactor 45 remains closed and the relay contact 48x remains open, and the motor 17a operates to close the gate 20a until the contact 22aa is opened, that is, when the gate is fully closed. The operation of the relay 50 and the closing of the gate 20a causes the relay 47 to close (43a, 47, 50a, 22cx, 22bx, 22ax, 39b, 39e, 27x, 43b). This finally deenergizes lockout magnet 52m at 47x. The opening of the contact 22aa, of course, deenergizes the contactor coil 45 and the relay coil 48. The system has now been brought to a standstill with relays 47, 50, and 51 closed, the remainder of the contactors and relays being open.

If the breaking of contact between finger 39a and pool 39d should occur when the contact 22aa is open, that is, when the gate 20a is fully closed, there will be another final partial opening of the gate. The amount of material discharged at each dribble, of course, is very small compared to the weight of the hopper contents and the error introduced by this operation is very slight. The opening of the contact 22aa, as usual, deenergizes contactor 45a and relay 48. The latter at its contact 48x causes the contactor 44 to close, operating the motor 17a so as to open the gate 20a. When the switch 22aa has been closed by the opening of the gate, the relay 50 is operated in the manner already described.

If it should happen that an excessive amount of material should be discharged into the weigh hopper, the contact-making mechanism 39 will be operated so that the finger 39c engages the pool 39e. This causes the reenergization of the lockout magnet 52m (43a, 52m, 52e1, 52k1, 52a1, 39c, 39e, 27x, 43b). Obviously, the only way this circuit can be opened is by removing material from the weigh hopper, since the magnet 52m locks the selector in operative position. When sufficient material has been removed from the weigh hopper to cause the finger 39c to break contact with the pool 39e, the lockout magnet 52m is deenergized and the selector switch 52 may be reset.

If the lockout magnet 52m is deenergized, pressure on the reset button 52r pulls the shaft 52s down and breaks contact between the fixed contacts of the selector and the bridging contacts. The weighing of the first class of material has now been completed and the next step, of course, is a similar weighing of the second class of material. To accomplish this, the selector switch shaft 52s is turned so that the bridging contacts 52k thereof connect the contacts in row 52b with the contacts in row 52f. When the shaft has been properly positioned, the knob 52n is pushed to cause the bridging contacts to engage their associated fixed contacts. The relay 49 is tripped or opened by this operation, its trip coil 49t being energized thereby (43a, 49t, 49d, 52f2, 52k2, 52b2, 43b). The tripping of relay 49 opens the original circuits for the beam magnets 41 and 42 at contacts 49a and 49b. A parallel circuit is established, however, for the magnet 42 which lifts the beam 37 (43a, 42, 52f3, 52k3, 52b3, 43b). Since the magnet 41 is deenergized, the load of the beam 36 is now added to that of the beam 35 and the indicating and contact-making mechanism 39 promptly returns to its original position as illustrated in Figures 3 and 9.

Finger 39a makes contact with pool 39d first and energizes relay coil 46 (43a, 46, 39a, 39d, 27x, 43b). Finger 39b then breaks contact with pool 39e but this has no effect since the circuit controlled thereby has already been opened at contact 22aa by the closing of the gate 20a. The closing of the contact 46a of the relay 46 restores the normal circuit for the lockout magnet 52m (43a, 52m, 52f1, 52k1, 52b1, 46a, 43b). As finger 39a engages pool 39d, the trip coil 50t of the relay 50 is energized (43a, 50t, 50b, 39a, 39d, 27x, 43b). The relay 50 is thus opened and at the contact 50a it breaks the circuit of relay coil 47, which thereupon closes its contact y to complete a circuit for the contactor coil 44 (43a, 51b, 44, 48x, 47y, 23x, 43b). Contact 47x is in parallel with the contact 46a in the previously described circuit for the lockout magnet 52m.

The terminals of the motors 17b are connected to contacts 52f4, 52f5 and 52f6 of the selector 52. When contactor 44 is closed, phases a and b of the supply source are connected to contacts 52b4 and 52b5. Phase c is permanently connected to contact 52b6. With the selector in such position, its bridging contacts 52k connect the contacts in row 52b with the contacts in row 52f and, therefore, the operation of the contactor 44 causes the motor 17b to operate to open the gate 20b.

The second weighing operation proceeds in exactly the same manner as the first and the system is again brought to rest with the relays 47, 50, and 51 energized, as before. The next step in the operation, of course, is the weighing of the third class of material. For this purpose, the selector 52 must be shifted to the third position after being reset by operating the bucket 52r. In the third position, of course, the contacts in the rows 52c are connected with the contacts in the row 52g. If it should happen, however, that the operator inadvertently moved the selector switch 52 back to position No. 1 and pushed the knob 52n, relay 49 would operate (43a, 49c, 49x, 52e2, 52k2, 52a2, 43b). The operation of the relay 49 would cause the magnets 41 and 42 to be energized in the manner already described. With the scale beams 36 and 37 lifted, the overload causes the finger 39c to dip into the pool 39e and energize locking magnet 52m. The contactor 44, however, cannot operate, since the relay 47 remains energized and keeps its contact 47y open, since the normal resetting operation of the relays 50 and 47 has not been effected by the making of contact by the finger 39a with the pool 39d, as previously explained. The system is now locked against any further operation until the contact-making mechanism 39 is manually tipped so that finger 39c breaks contact with pool 39e and deenergizes the lockout magnet 52m. The lockout magnet 52m may also be released by opening the circuit breaker 43.

Similar safeguards are provided against improper operation of the selector switch at the first stage of the weighing. If the operator turned the selector to the second or third position without going through the first cycle, the relay 51 would not have operated and the circuit of the contactor coil 44 could not be completed because the contact 51b of the relay 51 remains open. When the selector switch has been advanced through the first and second positions, and the first two weighing operations properly completed, the selector may then be advanced again to the third position.

Neither of the magnets 41 and 42 is energized in this position and the loads on both the beams 36 and 37 are added to that on the beam 35. The lockout magnet 52m is energized as before. The contact-making mechanism 39, of course, returned to the position illustrated in Figure 9 when the selector 52s was reset after the second operation, since that deenergized the beam magnet 42, the magnet 41 having been previously deenergized. The finger 39a, therefore, makes contact with the pool 39d and energizes the relay 46 even before the selector is actuated for the third weighing operation. The tripping coil of the relay 50 is similarly energized and the opening of the contact 50a deenergizes the relay 47. The circuit for the contactor coil 44 is thus completed but, until the selector shaft 52s is pushed upward, the circuit of the motor 17c is not completed. The third weighing cycle proceeds, however, when the selector switch is actuated, in the same manner as previously described, and the system is again brought to rest with the relays 47 and 50 energized and the lockout magnet 52m deenergized so that the selector switch can be moved to the fourth position.

If the selector is now improperly operated to the second or first positions, the same results will occur as previously described for such improper operation, namely, the finger 39c will make contact with the pool 39e and energize the lockout magnet 52m. If the selector is advanced to the fourth position, however, before being pushed, a normal discharge operation of the weigh hopper will result. Before the completion of the third weighing operation, the relay 51 is tripped by the normal deenergization of the relay 46 which causes the relay 50 to operate and in turn operate the relay 47. The tripping circuit for the relay 51 is 43a, 51t, 51a, 47a, 52g2, 52k2, 52c2, 43b. The relay 51, of course, is not tripped until the completion of the third operation, since the tripping circuit includes the contacts 47a and 52g2, which are both closed only at the end of the third weighing operation.

The relay 51 is therefore restored to its original position before the selector 52 is advanced to the fourth position. The contactor 44 is energized (43a, 52d6, 52k6, 52h6, 44, 51y, 43b). The operation of the contactor 44 energizes the release solenoid 24s for the door 24 when the selector shaft 52s is pushed (43a, 44b, 52d3, 52k3, 52h3, 52h2, 52k2, 52d2, 24s, 43b). Upon the energization of the solenoid 24s, the latch 24a is released and the door 24 drops, discharging the contents of the weigh hopper 14 into a vehicle waiting therebelow. The opening of the back contact 27x of the switch 27 prevents any further operation of the contactor 44 to open any of the discharge gates and the closing of the front contact 27a energizes the lockout magnet 52m to prevent any further change in the setting of the selector until the load in the weigh hopper has been completely discharged (43a, 52m, 52h1, 52k1, 52d1, 27a, 43b). When the weigh hopper has been completely discharged, the counterweight 26 recloses it, opening the contact 27a and reclosing the contact 27x. The magnet 52m is thus deenergized and further adjustment of the selector is possible. Contact mechanism 39 is also restored to original position on dumping the hopper. If the selector is moved back to any of its former positions, the locking out operations already described will occur. If the selector is turned forward one step, it is brought into position for a repetition of the first weighing operation, since the contacts of the selector are spaced around a cylinder and are thereby repeatedly engaged in proper succession.

It will be apparent that the invention is not limited to any particular number of feed hopper gates, the only requisite being that the selector have a sufficient number of contacts for all the gates it is desired to control. It is also obvious that the operation of the selector may be made automatic if desired, by the use of suitable automatic electric control auxiliaries.

Reviewing the novel features and advantages of the invention, it will be apparent that it is possible to obtain great accuracy through my invention since the flow of material from the feed hopper to the weigh hopper is slowed down as the weight discharged approaches the desired limit and, thereafter, the flow of material is continued at a reduced rate or dribble feed until precisely the desired amount has been weighed out. The feed gate is started closing before the total desired amount has been weighed out and, as a matter of fact, the gate is entirely closed with less than the desired weight, but is reopened slightly a sufficient number of times to weigh out exactly the right amount of material and finally close the gate. The invention also provides means for locking the system against further operation in case an excessive amount of material is discharged. The system is, furthermore, interlocked to guard against improper sequence of operations, such as opening the feed gates when the batcher door is open. The lockout does not become effective until the excess amount weighed out exceeds the limits of tolerance.

Although I have illustrated and described but one present preferred embodiment of the invention, it will be apparent that numerous changes therein may be made without departing from the spirit thereof or the scope of the appended claims.

I claim:

1. In a weighing batcher, the combination with a balance-hung weigh hopper, and a feed hopper gate controlling the flow of material to the weigh hopper, of manually operable means for causing the opening of the gate, means responsive to the weight of material in the weigh hopper for closing the gate, and repeatedly opening the gate to a slight extent and reclosing it, said weight responsive means also having means effective to close the gate finally.

2. In a weighing batcher, the combination with a balance-hung weigh hopper, of a feed hopper gate controlling the flow of material into the weigh hopper, of manually operable means for opening the gate, and means responsive to the weight of material in the weigh hopper for causing the gate to shut and reopen slightly to feed material at a reduced rate, and finally to stop in closed position.

3. The combination with a balance-hung weigh hopper and a feed hopper gate controlling the admission of material thereto, of means for opening the gate initially to admit material to the weigh hopper, and means responsive to the weight of material in the weigh hopper for successively causing the gate to close, partially reopen, and finally to close again.

4. The combination with a weigh hopper and a movable gate controlling the flow of material thereto, of means for opening the gate to feed material to the hopper, and means responsive to the weight of material in the hopper for closing the gate, reopening it and finally closing it again.

5. The combination with a weighing hopper and a gate controlling the feed of material thereto, of means for opening the gate to feed material to the hopper, means controlled by the weight of the material in the hopper for closing the gate and partially reopening it to produce a dribble feed, and means also controlled by the weight of material in the hopper for finally closing the gate.

6. In an automatic weigher, a receiver, a movable gate controlling the flow of material to the receiver, said gate being effective when open to feed material to the receiver at a predetermined initial rate, and means responsive to the weight of material in the receiver for closing the gate and partly opening it to provide a dribble feed of material at a lower rate, and again closing the gate.

7. The combination with a weigh hopper, a plurality of gates controlling the flow of material thereto, a rotating controller for selectively opening said gates, of weight responsive means for closing said gates, means for preventing reverse rotation of said controller, said controller being effective in at least one position to cause dumping of said hopper.

8. In a weighing batcher, a weigh hopper, a feed gate controlling the flow of material thereto, operating means for the gate, a controller for causing said means to open the gate, and means rendered effective on operation of the controller to open the gate, for locking the controller against further operation until a predetermined weight of material has been supplied to the weigh hopper.

9. The apparatus defined by claim 8 wherein said lockout means is rendered effective upon the delivery of an excess amount of material to said weigh hopper.

10. In combination with a weigh hopper, a plurality of gates controlling the flow of material thereto, operating means for each gate, weight responsive means for causing the closing of said gates, a selector for selectively connecting the gate-closing means to any one of said gate-operating means, and means responsive to the operation of said selector in other than a predetermined sequence for preventing opening of said gates.

11. In a weighing batcher, the combination with a weigh hopper, of a plurality of feed gates controlling the admission of material thereto, operating means for each of said gates, weight responsive means effective to cause one of said operating means to close a selected gate upon the discharge thereby of a predetermined amount of material, a selector for connecting said weight responsive means to control any of said gate-operating means, and means for preventing operation of the selector after the opening of one of said gates, until a predetermined amount of material has been discharged thereby and the gate closed.

12. In a weighing batcher, a weigh hopper, a plurality of feed gates controlling the flow of material thereto, operating means for each of said gates, means responsive to the weight of material in the weigh hopper effective to cause the operating means to close a gate, and a selector effective to connect said weight responsive means to control any selected one of the gates.

13. In a weighing batcher, the combination with a weigh hopper and gates controlling the feed of material thereto, of operating means for each gate, a controller responsive to the weight of material in the weigh hopper for causing the operating means of a selected gate to close it, a manually operable selector for connecting said controller to control any one of said gates, said selector being effective in one position to cause dumping of the weigh hopper, and means responsive to an excess weight in the weigh hopper for locking said selector against movement to said position.

14. In a weighing batcher, the combination with a weigh hopper and a plurality of gates controlling the flow of different classes of material thereto, of operating means for each gate, mechanism responsive to the weight of the weigh hopper for controlling said operating means to close a selected one of said gates, a selector adapted to connect said mechanism with the operating means of any one of said gates, and means on the selector effective on operation of the latter whereby said mechanism causes the gate-operating means of a selected gate to open it, said mechanism including a plurality of scale beams for successively determining the amounts of the different classes of material required to actuate the gate-closing means.

15. In an automatic weigher, a balance-hung weigh hopper, a plurality of feed hopper gates controlling the admission of material thereto, means for automatically operating said gates, a controller responsive to the weight of the weigh hopper for causing said operating means to close a gate, and a manually operable selector for connecting said controller with a selected one of said gates for closing it when the weight of the hopper reaches a predetermined value, said selector having means effective on operation of the selector for causing the gate-operating means to open said one of said gates.

16. The apparatus defined by claim 15 characterized by a plurality of scale beams adapted to control the operations of the several gates, and electromagnetic means controlled by said selector for rendering said scale beams ineffective.

17. The apparatus defined by claim 15 characterized by a lockout mechanism actuated by the discharge of an excessive amount of material by one of said gates, said lockout mechanism being effective to prevent further operation of said selector.

HAROLD E. McCRERY.